April 20, 1937.                 C. L. COOK                    2,077,462
                              POTATO DIGGER
                            Filed June 4, 1934
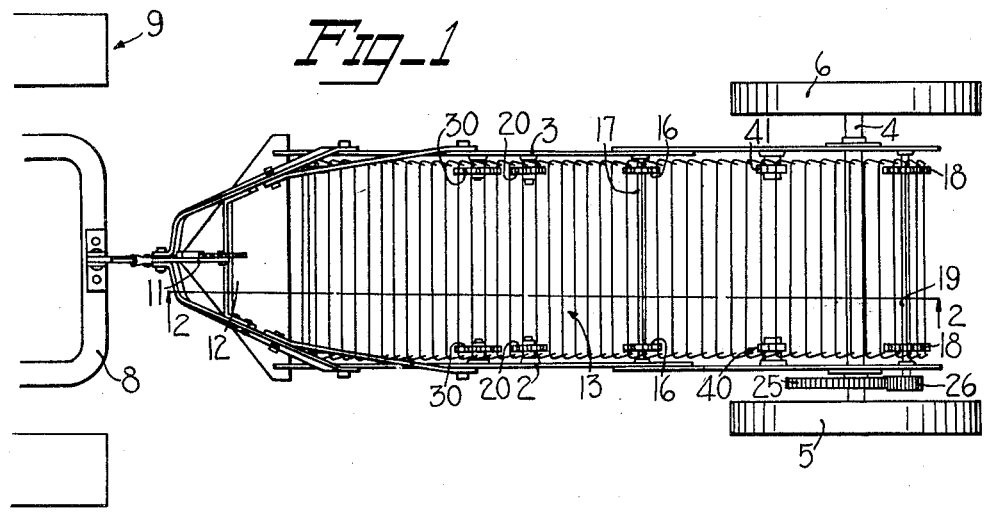
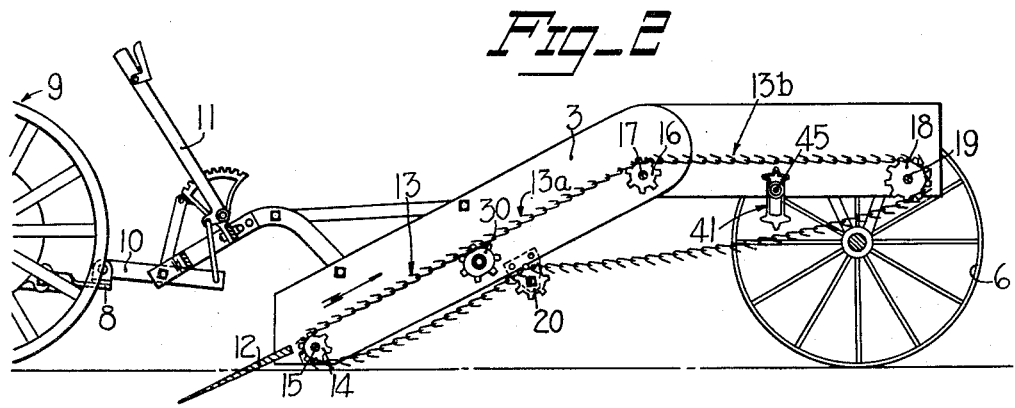
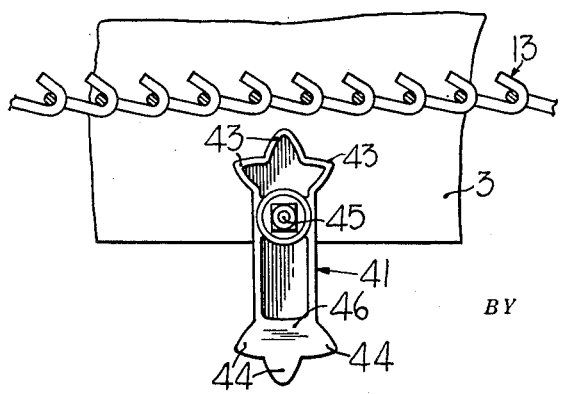

Patented Apr. 20, 1937

2,077,462

UNITED STATES PATENT OFFICE 2,077,462

POTATO DIGGER

Curtiss L. Cook, Syracuse, N. Y., assignor to Syracuse Chilled Plow Co., Inc., Syracuse, N. Y., a corporation of New York Application June 4, 1934, Serial No. 728,831

7 Claims. (Cl. 209—308)

This invention relates to potato diggers and particularly to those provided with an endless slatted conveyor for conveying the material dug by the digging tool to the rear of the machine, during which operation the soil is separated from the potatoes by falling through the conveyor. In potato diggers of this type it is usual to provide means for agitating the conveyor to encourage the separating operation of the soil from the potatoes. It is desirable to provide the least amount of agitation necessary to obtain complete separation. Any additional agitation of the conveyor after the soil has been separated from the potatoes is likely to do injury to the potatoes. To meet this requirement, it is usual to make the agitating means detachable, or mounted so they may be manually shifted into and out of operation, so that they may be employed only when desired. Soil conditions vary considerable even in the same field but with the present hand operated shifting devices it is too laborious, if not impractical, to shift the agitating means into and out of operation each time a different soil condition is met.

The principal object of this invention is to provide means for automatically producing agitation in the conveyor when and only when agitation is necessary. In general this object is accomplished by providing a set of agitating idler sprocket elements below the conveyor and normally out of engagement therewith, but disposed to be engaged by the conveyor whenever the conveyor sags to a certain degree due to the presence of an abnormal weight of material on the conveyor. The engagement of the conveyor with the agitating idler sprocket elements at such time causes rotation of the latter and the consequent agitation of the conveyor. Accordingly, another object of the invention is to provide means normally inoperative but responsive to the presence of a certain weight of material on the conveyor for producing agitation of the conveyor.

A preferred embodiment of my invention is described in the following specification and illustrated in the accompanying drawing in which:

Figure 1 is a top view of a single row tractor drawn potato digger modified in accordance with my invention;

Figure 2 is a cross-sectional view along the line 2—2 of Figure 1; and,

Figure 3 is an enlarged fragmentary view of one of the agitating idler sprocket elements shown in its normal inoperative position with respect to the conveyor of the potato digger.

The potato digger illustrated in the drawing includes a frame comprising two spaced side members 2 and 3 mounted at the rear on an axle 4 supported upon ground wheels 5 and 6. The front end of the frame is connected to and is supported by the drawbar 8 of a tractor 9 through a draft member 10 which is adjustably connected to the front end of the frame through a raising and lowering lever 11. A digging tool 12 is provided at the forward end of the frame. Between the side members 2 and 3 and extending rearwardly from a point directly in rear of the digging tool 12 an endless slatted conveyor 13 is provided. Conveyor 13 is disposed over sprockets 14 fixed to shaft 15 disposed between side members 2 and 3 at the front end of the frame, over idler sprockets 16 mounted on shaft 17 spaced rearwardly and above shaft 15, and over a pair of sprockets 18 fixed to shaft 19 disposed between side members 2 and 3 at the rear of the machine. The conveyor 13 thus includes an inclined portion 13a and a horizontal portion 13b. The lower run of the conveyor is supported so as not to drag on the ground, upon a pair of idler sprockets 20 supported on brackets depending from the side members 2 and 3, respectively. The conveyor is operated from power derived from ground wheels 5 and 6 through axle 4 by means of a gear 25 fixed to axle 4 which meshes with a pinion 26 fixed on the end of shaft 19.

Between shafts 15 and 16 a pair of elliptical idler sprockets 30 are provided to produce an initial or minimum amount of agitation in the upper run of the portion 13a of the conveyor during operation. These idlers are suitably mounted from the side members 2 and 3, respectively, for free rotation. If such initial agitation is not desired, these elliptical idlers may be replaced by rollers or circular sprockets.

The invention in this case resides specifically in the provision of a pair of eccentrically mounted idler sprocket elements 40 and 41 below the upper run of the horizontal portion 13b of the conveyor between shafts 17 and 19. Each idler sprocket element 40 and 41 consists of an elongated member having three sprocket teeth 43 at one end and three sprocket teeth 44 at the other end. Each sprocket element is pivotally mounted from the side of the digger on a pivot bolt 45 which is disposed considerably closer to sprocket teeth 43 than to sprocket teeth 44. As a result of this eccentric mounting, each sprocket element, when out of engagement with the conveyor chain 13, normally comes to rest in the position shown in Figures 2 and 3. To further assure the sprocket elements assuming this position, they have been additionally weighted in the region of sprocket teeth 44 as is shown at 46. Pivot bolts 45 are disposed so that normally the conveyor 13 does not contact with the upper sprocket teeth 43. Inasmuch as the conveyor is operated from shaft 19 at the rear, the upper side of the conveyor normally is taut which holds the conveyor out of engagement with sprocket elements 40 and 41.

In operation, whenever a soil condition is encountered in which the soil does not separate from the potatoes while it is being carried over the inclined portion 13a of the conveyor between shafts 15 and 17 and a large quantity of soil still adheres to the potatoes at the time it reaches the horizontal portion 13b of the conveyor between shafts 17 and 18, the weight thereof together with the weight of the potatoes on the conveyor will cause sufficient sag in the conveyor in this region to cause the conveyor to come in contact with the sprocket teeth 43 of the idler sprocket elements 40 and 41. This will cause rotation of the sprocket elements 40 and 41, which, due to the eccentric mounting of these sprocket elements, will cause this portion of the conveyor to be oscillated vertically or agitated. Elements 40 and 41 are so designed that before the last of teeth 43 disengages from the conveyor, the first of teeth 44 will engage therewith, as a result of which the elements 40 and 41 will continue to rotate with the conveyor as long as there is sufficient weight on the conveyor to cause it to remain in contact with teeth 43 each time the sprocket elements assume the positions shown in Figures 2 and 3. When the soil carried up to the horizontal portion 13b of the conveyor has been separated from the potatoes as a result of such agitation, the conveyor will no longer sag sufficiently to remain in engagement with the idler sprocket elements when they assume the position shown in Figures 2 and 3. Thereupon, the sprocket elements will come to rest, and agitation of the horizontal portion 13b of the conveyor will cease.

While I have shown a preferred form of my invention, the structure could obviously be modified in various respects without departing from the spirit of the invention. If somewhat more gentle agitation is desired than is produced with the sprocket elements 40 and 41 of my preferred design, circular sprockets but eccentrically mounted might be substituted therefor. The idler sprocket elements might also take the form of elliptical members pivoted at their centers with separate means such as a spring operating upon a cam for causing the elliptical sprocket elements to normally assume a position with their minor axes perpendicular to the conveyor, that is, in the position in which either low side is adjacent to the conveyor. While, as shown in the structure illustrated, I prefer to provide elliptical idler sprockets 30 in the inclined portion 13a of the conveyor to provide a minimum degree of agitation at all times, automatically operating agitating means such as is provided by eccentrically mounted idler sprockets 40 and 41 could be substituted for the elliptical idler sprockets 30.

What I claim is:—

1. The combination with a potato digger having an endless slatted conveyor for conveying material to the rear of the digger and for simultaneously separating soil from the potatoes, of an agitator for said conveyor comprising an idler sprocket eccentrically mounted on the digger for free rotation with respect thereto below the conveyor and normally out of engagement therewith but disposed to be engaged by said conveyor whenever said conveyor sags to a certain degree due to a certain weight of material on the conveyor above said idler sprocket, said conveyor when in engagement with said idler sprocket causing rotation thereof during the existence of said certain weight of material on said conveyor above said idler sprocket, and the rotation of said idler sprocket causing said conveyor to be agitated.

2. The combination with a potato digger having an endless slatted conveyor for conveying material to the rear of the digger and for simultaneously separating soil from the potatoes, of an agitator for said conveyor comprising an idler sprocket, a pivot supported from the side of the digger below said conveyor and upon which said idler sprocket is mounted for free rotation, said sprocket having certain teeth spaced at a lesser distance from said pivot than other teeth, means for causing said sprocket to normally assume a position with said certain teeth adjacent said conveyor, said pivot being disposed to position said idler sprocket normally out of engagement with said conveyor but so as to be engaged thereby whenever said conveyor sags to a certain degree due to a certain weight of material on the conveyor above said idler sprocket, said conveyor when in engagement with said idler sprocket causing rotation thereof during the existence of said certain weight of material on said conveyor above said idler sprocket, and the rotation of said idler sprocket causing said conveyor to be agitated.

3. The combination with a potato digger having an endless slatted conveyor for conveying material to the rear of the digger and for simultaneously separating soil from the potatoes, of an agitator for said conveyor comprising an elongated member having a set of sprocket teeth at each end, a pivot on said digger below said conveyor upon which said member is mounted adjacent one end for free rotation, whereby said member normally assumes a position with said one end adjacent said conveyor, said pivot being disposed to position said member normally out of engagement with said conveyor but so as to be engaged thereby whenever said conveyor sags to a certain degree due to a certain weight of material on the conveyor above said member, said conveyor when in engagement with said member causing rotation thereof during the existence of said certain weight of material on said conveyor above said member, and the rotation of said member causing said conveyor to be agitated.

4. The combination with a potato digger having an endless slatted conveyor for conveying material to the rear of the digger and for simultaneously separating soil from the potatoes, of an agitator for said conveyor comprising an elongated member having a set of sprocket teeth at each end, a pivot on said digger below said conveyor upon which said member is mounted adjacent one end for free rotation, whereby said member normally assumes a position with said one end adjacent said conveyor, said member being additionally weighted near the other end to augment the tendency of the member to assume the aforesaid position, said pivot being disposed to position said member normally out of engagement with said conveyor but so as to be engaged thereby whenever said conveyor sags to a certain degree due to a certain weight of material on the conveyor above said member, said conveyor when in engagement with said member causing rotation thereof during the existence of said certain weight of material on said conveyor above said member, and the rotation of said member causing said conveyor to be agitated.

5. In a harvester of the digger type having a conveyor for receiving the crop together with soil in varying amounts and adhering to the crop in varying degrees and for conveying the crop to a point of discharge, an agitator for said conveyor eccentrically mounted on the digger for free rotation with respect thereto below the conveyor and normally out of engagement therewith but so located as to be engaged by the conveyor whenever the conveyor sags to a certain degree due to a certain weight of material on the conveyor above said agitator, said agitator adapted to be rotated when engaged by the conveyor and to cause the conveyor to be agitated while being rotated.

6. In a harvester of the digger type having a conveyor for receiving the crop together with soil in varying amounts and for conveying the crop to a point of discharge, said conveyor being adapted to sag a certain amount when a certain weight of material is disposed on the conveyor, a normally inoperative agitator responsive to the sagging of said conveyor to said certain amount for agitating the conveyor to separate the dirt from the crop.

7. In a harvester of the digger type having a conveyor for receiving the crop together with soil in varying amounts and for conveying the crop to a point of discharge, said conveyor being adapted to sag a certain amount when a certain weight of material is disposed on the conveyor, a normally inoperative agitator responsive to the sagging of said conveyor to said certain amount for agitating the conveyor to separate the dirt from the crop, and means for urging said agitator to an inoperative position whenever the sag of said conveyor becomes less than said certain amount.

CURTISS L. COOK.